United States Patent [19]
Yabushita et al.

[11] Patent Number: 5,747,905
[45] Date of Patent: May 5, 1998

[54] HERMETIC MOTOR DRIVEN FLUID APPARATUS HAVING IMPROVED INSULATING STRUCTURE

[75] Inventors: Junichi Yabushita; Shinichi Otake, both of Isesaki; Yuji Yoshii, Takasaki, all of Japan

[73] Assignee: Sanden Corporation, Gunma, Japan

[21] Appl. No.: 453,682

[22] Filed: May 30, 1995

Related U.S. Application Data

[63] Continuation of Ser. No. 194,092, Feb. 8, 1994, Pat. No. 5,514,922.

[30] Foreign Application Priority Data

Feb. 8, 1993 [JP] Japan ................................. 5-3314 U
Feb. 8, 1993 [JP] Japan ................................. 5-20137

[51] Int. Cl.[6] ................................................. H02R 15/14
[52] U.S. Cl. ................................................. 310/89; 310/88
[58] Field of Search ................................ 310/85, 87, 88, 310/89

[56] References Cited

U.S. PATENT DOCUMENTS

| | | | |
|---|---|---|---|
| 3,579,037 | 5/1971 | Hackman | 310/87 X |
| 3,646,374 | 2/1972 | Jordan et al. | 310/45 |
| 4,000,238 | 12/1976 | Shigemi et al. | 417/410 |
| 4,201,521 | 5/1980 | Carlson | 417/53 |
| 4,215,464 | 8/1980 | Miller | 29/596 |
| 4,279,520 | 7/1981 | Heath | 310/13 X |
| 4,466,784 | 8/1984 | Hiraga | 418/55 |
| 4,609,334 | 9/1986 | Muir et al. | 418/55 |
| 4,616,407 | 10/1986 | Tamaki et al. | 29/596 |
| 4,931,678 | 6/1990 | Lutz | 310/62 |
| 4,931,682 | 6/1990 | Borcherding et al. | 310/89 |
| 4,940,396 | 7/1990 | Shimizu et al. | 417/410 |
| 5,024,857 | 6/1991 | Arakawa | 427/104 |
| 5,298,824 | 3/1994 | Franz | 310/89 |
| 5,304,877 | 4/1994 | Baek | 310/45 |
| 5,334,894 | 8/1994 | Ineson et al. | 310/89 |
| 5,349,259 | 9/1994 | Kaneko et al. | 310/261 |
| 5,514,922 | 5/1996 | Yabushita et al. | 310/45 |

FOREIGN PATENT DOCUMENTS

| | | |
|---|---|---|
| 61-226587 | 10/1986 | Japan . |
| 1178799 | 7/1989 | Japan . |
| 4081581 | 3/1992 | Japan . |
| 6036 | 3/1913 | United Kingdom . |

OTHER PUBLICATIONS

Alan J. Taylor et al., "Developments In Covered Conductors," BEAMA Electrical Insulation Conference pp.1–13, Apr. 1970.

*Primary Examiner*—Steven L. Stephan
*Assistant Examiner*—Judson H. Jones
*Attorney, Agent, or Firm*—Baker & Botts, L.L.P.

[57] ABSTRACT

An improved electrical insulation structure is provided for a motor driven fluid apparatus having the compression and drive mechanisms within a hermetically sealed housing. The drive mechanism comprises a drive shaft operatively connected to the compression mechanism and a motor for rotating the drive shaft. The motor comprises a rotor fixedly surrounding the drive shaft and a stator assembly surrounding the rotor with a small radial air gap therebetween. The stator assembly comprises an annular magnetic core fixedly secured to the housing. The core has a plurality of axially extending slots and a plurality of windings, each having a plurality of coils formed by multiple turns of an enamel-coated conductor. The multiple turns of the conductor have side turn portions which are disposed within the axially extending slots and end turn portions which axially project from the slots and are generally disposed about the axial end surfaces of the core. The connection points between the windings themselves, and between the windings and conductor leads, are fixedly covered with a film of insulating material, such as epoxy resin. Alternatively, a portion of the surface of the housing is fixedly covered with a film of insulating material, such as aluminum oxide formed by anodization.

28 Claims, 5 Drawing Sheets

HERMETIC MOTOR DRIVEN FLUID APPARATUS HAVING IMPROVED INSULATING STRUCTURE

This application is a continuation of application Ser. No. 08/194,092, filed Feb. 8, 1994 now U.S. Pat. No. 5,514,922 entitled "HERMETIC MOTOR DRIVEN FLUID APPARATUS HAVING IMPROVED INSULATING STRUCTURE".

BACKGROUND OF THE INVENTION

1. Field of the Invention

The invention relates generally to a motor driven fluid apparatus and, more particularly, to a motor driven fluid apparatus having compression and drive mechanisms within a hermetically sealed container.

2. Description of the Related Art

Motor driven fluid apparatuses having compression and drive mechanisms within a hermetically sealed housing for use in a refrigeration circuit are generally well-known. For example, in FIG. 3 of Japanese Patent Application Publication No. 1-178799 ("Japanese '799"), there is shown a compressor having a hermetically sealed housing which encloses a compression mechanism, such as a scroll-type compression mechanism, and a drive mechanism therein. The drive mechanism comprises a drive shaft and a motor for rotating the drive shaft. The motor comprises a rotor, which is operatively coupled to the drive shaft, and a stator assembly surrounding the rotor with a small radial air gap therebetween.

Typically, the motor of Japanese '799 is provided with a stator assembly as disclosed in U.S. Pat. No. 4,215,464 to Miller ("Miller"). The stator assembly comprises an annular magnetic core having a plurality of axially extending slots, which are formed at an inner peripheral surface of the core, and a plurality of windings, each having a plurality of coils formed by multiple turns of an enamel-coated conductor. The multiple turns of the conductor have side turn portions, which are disposed within the axially extending slots, and end turn portions, which project axially from the slots and are disposed about the axial end surfaces of the core. The windings are electrically connected to each other and to one end of the conductor leads in various configurations depending on a variety of factors, such as the number of windings and whether the windings are to be connected in parallel or in series.

If the above-described electrical interconnections are not properly insulated, electricity from the interconnections may be conducted, for example, by a refrigerant contained within the housing, to other parts of the apparatus, such as the housing. This unintentional conduction of electricity can result in an unsafe and offensive electrical shock when, for example, a person touches the housing to service the components therein. In order to prevent this unintentional conduction of electricity, the connection points of the electrical interconnections in Miller are covered by plastic tubular members having an electrical insulation characteristic. Further, the connection points are generally disposed within or about one of the end turn portions of the multiple turns of the conductor.

The other end of the conductor leads is electrically connected to one end of a plurality of external power conductor terminals, which are fixedly and insulatingly held by an insulating base. Typically, the base is fixedly and hermetically secured to the housing. Further, as shown in Japanese Patent Application Publication No. 4-81581 ("Japanese '581"), in order to prevent unintentional conduction of electricity from the above-described electrical interconnections, the connection points are hermetically coated with a plastic having electrical insulation and anti-heat characteristics.

Several problems result, however, from these prior insulation structures. For instance, the connection points between the windings themselves, and between the windings and the one end of the conductor leads, are only insulated by the tubular members. Therefore, air gaps or apertures between the connection points and the tubular members are typically created, thereby resulting in insufficient and/or inefficient electrical insulation.

Additionally, apertures, e.g., pin holes, can unexpectedly form at an exterior surface of the end turn portions of the multiple turns of the enamel-coated conductor. Other apertures can also form, for example, by portions of the enamel unexpectedly separating at the exterior surface of the end turn portions. This formation of apertures can occur, for example, while transporting the stator assembly or setting a configuration of the end portions of the multiple turns. Typically, these apertures also result in insufficient electrical insulation.

As described above, because of these and other shortcomings of prior insulation structures, a person may receive an unsafe and offensive electric shock when he or she touches the compressor housing in order to service the components therein. Electric shock is especially likely if a refrigerant having a relatively high conductivity, such as $C_2H_2F_4$ (HFC-134a) or $CClHF_2$ (HCFC-22), is charged into the refrigerant circuit while the compressor operates in a situation where a suction chamber of the compressor housing is in a liquid-rich state. In this situation, the relatively high conductivity of the refrigerant excessively increases the amount of electricity which is conducted by the refrigerant to the housing from the above-described connection points, pin holes, and separated portions of enamel coating.

Other problems typically result from conventional structures for insulating electrical interconnections in motor driven fluid apparatuses.

SUMMARY OF THE INVENTION

Accordingly, it is an object of the present invention to provide an improved electrical insulation structure for a motor driven fluid apparatus, which comprises compression and drive mechanisms within a hermetically sealed housing. The structure improves electrical insulation of a stator assembly, which is disposed within the housing.

According to an embodiment of the present invention, a motor driven fluid apparatus is provided having a housing which houses compression and drive mechanisms therein. The drive mechanism comprises a drive shaft operatively connected to the compression mechanism and a motor for rotating the drive shaft. The motor comprises a rotor operatively coupled to the drive shaft and a stator assembly surrounding the rotor with a small radial air gap therebetween. The stator assembly comprises an annular magnetic core having a plurality of axially extending slots formed at an inner peripheral surface thereof. The stator assembly further comprises a plurality of windings, each having a plurality of coils formed by multiple turns of a conductor, of which an exterior surface is coated by a film of a first material having an electrical insulation characteristic. The first insulating material may be, for example, enamel.

The multiple turns of the conductor have side turn portions which are disposed within the axially extending slots and end turn portions which project axially from the slots and are disposed about the axial end surfaces of the core. The windings are electrically connected to each other and to one end of a plurality of conductor leads. The connecting points between the windings themselves, and between the windings and the one end of the plurality of conductor leads, are generally disposed within or about one of the end turn portions of the multiple turns of the conductor.

According to one embodiment of the present invention, at least one of the end turn portions of the multiple turns of the conductor is insulatingly covered by a film of a second material having an electrical insulation characteristic. Both end turn portions may be covered by this film. The second insulating material may be any suitable material including, but not limited to, an epoxy resin or a phenol resin.

In another embodiment of the present invention, a hermetic-type motor driven fluid apparatus comprises a housing having exterior and interior surfaces, which houses compression and drive mechanisms therein. The drive mechanism comprises a drive shaft operatively connected to the compression mechanism and a motor operatively coupled to the drive shaft for rotating the drive shaft.

At least a portion of the housing is insulatingly covered by a material having an electrical insulation characteristic. According to one aspect of this embodiment, a portion of the inner surface of the housing is insulatingly covered and the entire inner surface may be covered. According to another aspect of this embodiment, a portion of the exterior surface is insulatingly covered and the entire exterior surface may be covered. According to yet another aspect of this embodiment, portions of both the interior and exterior surfaces are insulatingly covered and the entire interior and exterior surfaces may be covered.

According to a feature of all aspects of this embodiment, the housing may comprise a plurality of housing portions which are fixedly connected to form the housing. In this arrangement, mating surfaces may exist where the housing portions are fixedly connected. According to this feature, the mating surfaces of the housing portions may be insulatingly covered.

In this embodiment, the material having an electrical insulation characteristic may be any suitable material including, but not limited to, a film of either epoxy resin or urethane resin formed by powder coating. The material may also include a film of silicone, phenol resin, urethane resin, butyl rubber, ethylene propylene rubber, chloroprene rubber, or nitrile-butadiene rubber, where the film is formed by dip coating or by application to the covered portion. Where the housing is made of an aluminum alloy, the material may also include a film of aluminum oxide formed by anodization.

The above-described embodiments, aspects, and features may be combined to provide improved electrical insulation of the electrical interconnections of the motor driven fluid apparatus.

Further objects, features, and advantages of the present invention will be understood from the detailed description of the preferred embodiments of the present invention with reference to the appropriate figures.

DETAILED DESCRIPTION OF THE PREFERRED EMBODIMENTS

Figure 1:
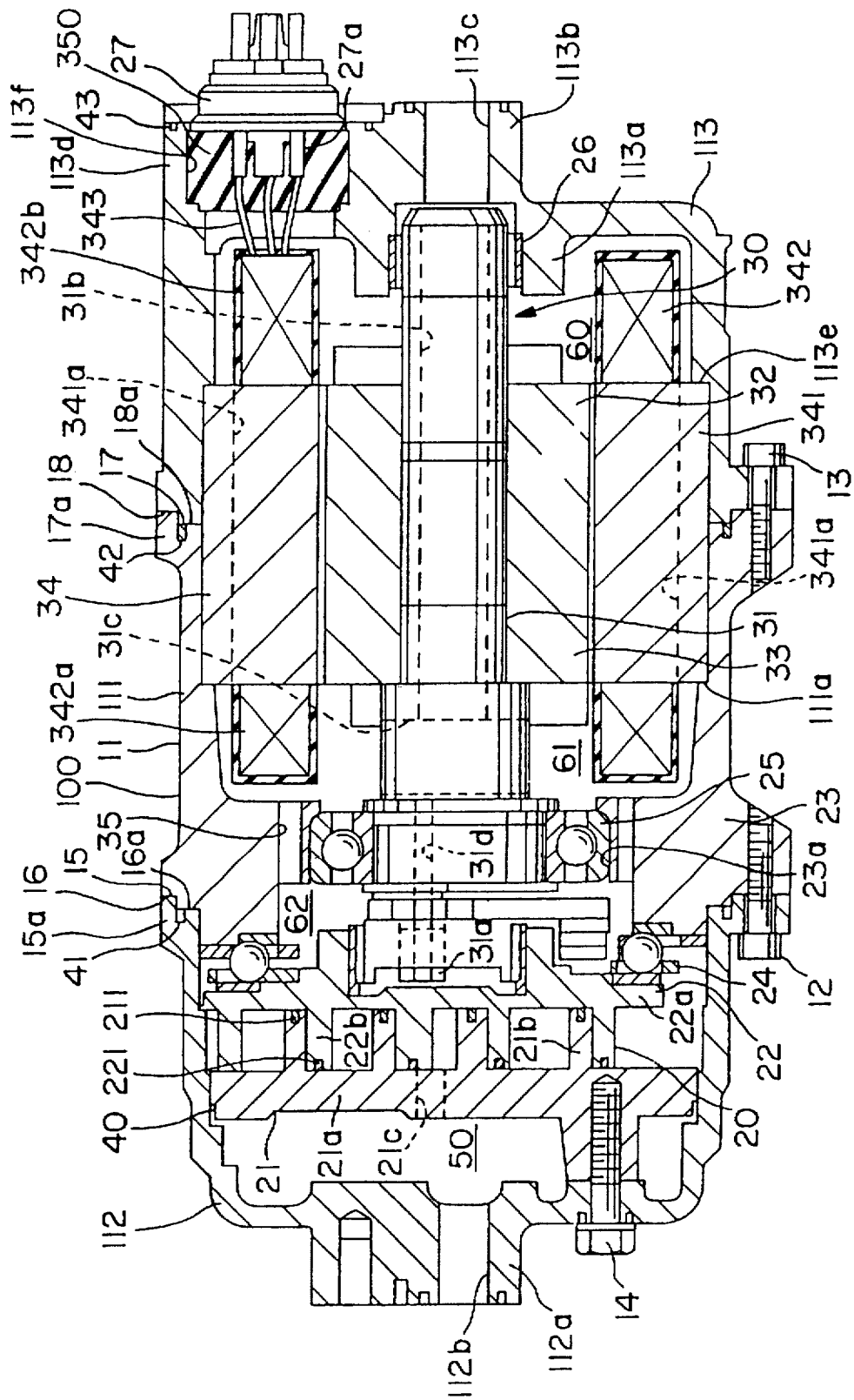
FIG. 1 is a longitudinal sectional view of a motor driven fluid apparatus according to a first embodiment of the present invention.
Figure 2:
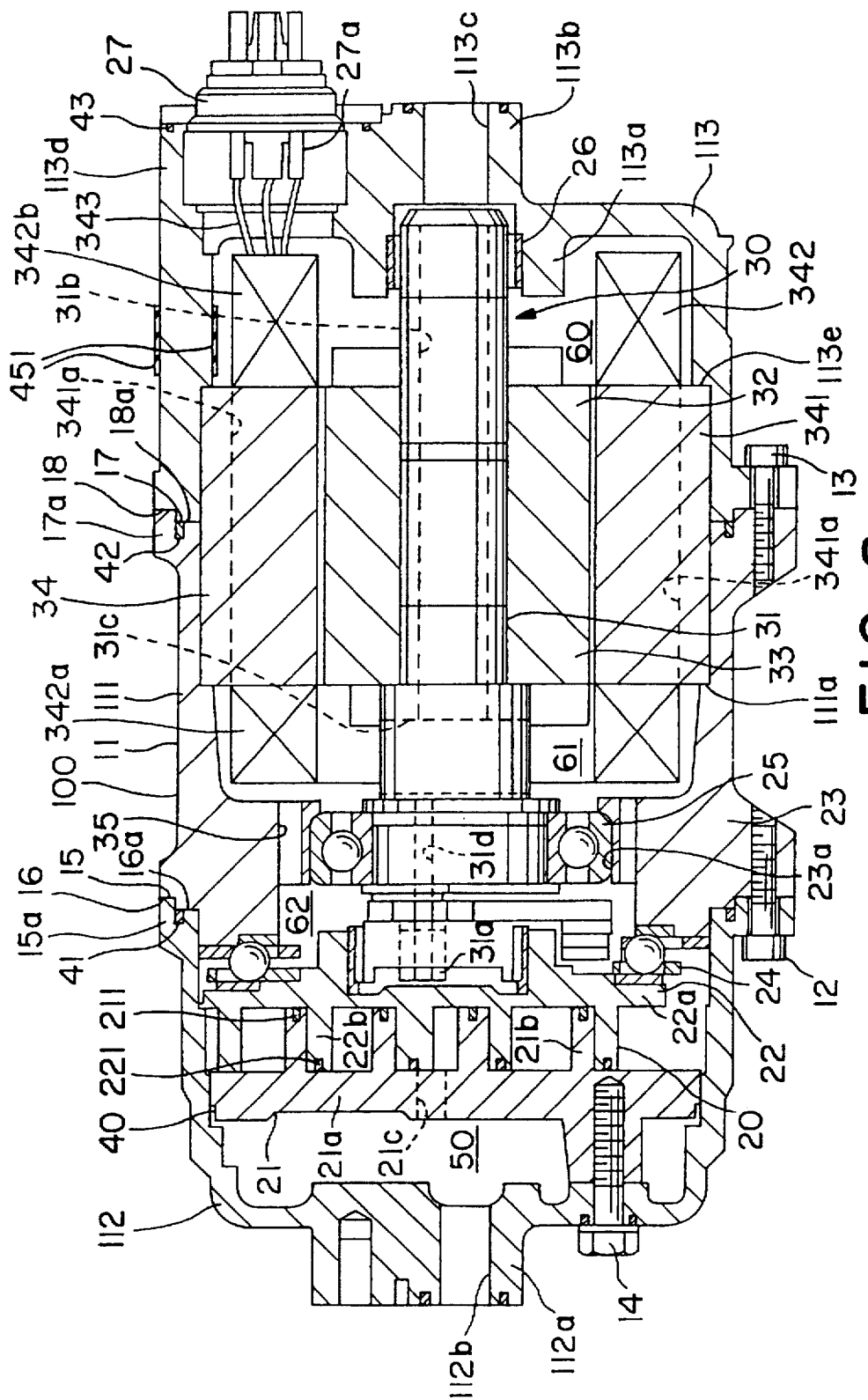
FIG. 2 is a longitudinal sectional view of a motor driven fluid apparatus according to a first aspect of a second embodiment of the present invention.

FIGS. 1–4 illustrate an overall construction of a hermetic-type motor driven fluid apparatus in accordance the present invention. For purposes of explanation only, the left side of FIGS. 1–4 will be referred to as the forward end or front of the compressor and the right side of the FIGS. 1–4 will be referred to as the rearward end or rear of the compressor. Further, in each of FIGS. 2–4, elements similar to those shown in FIG. 1 are accorded like numerals with respect to FIG. 1 and the description of some of the identical elements is substantially omitted.

Referring to FIG. 1, compressor 10 comprises a compressor housing 11, which houses a compression mechanism 20. Mechanism 20 is a scroll-type fluid compression mechanism. A drive mechanism 30 is also housed within housing 11. Housing 11 comprises cylindrical portion 111, and first and second cup-shaped portions 112 and 113. An opening end of first cup-shaped portion 112 is releasably and hermetically connected to a front opening end of cylindrical portion 111 by a plurality of bolts 12. An opening end of second cup-shaped portion 113 is releasably and hermetically connected to a rear opening end of cylindrical portion 111 by a plurality of bolts 13.

Scroll-type fluid compression mechanism 20 comprises fixed scroll 21 having circular end plate 21a and spiral element 21b, which rearwardly extends from circular end plate 21a. Circular end plate 21a of fixed scroll 21 is fixedly disposed within first cup-shaped portion 112 by a plurality of bolts 14. Mechanism 20 further comprises orbiting scroll 22 having circular end plate 22a and spiral element 22b, which forwardly extends from circular end plate 22a. Spiral element 21b of fixed scroll 21 interfits with spiral element 22b of orbiting scroll 22 with an angular and radial offset.

Seal element 211 is disposed at an end surface of spiral element 21b of fixed scroll 21, thereby sealing the mating surfaces of spiral element 21b of fixed scroll 21 and circular end plate 22a of orbiting scroll 22. Similarly, seal element 221 is disposed at an end surface of spiral element 22b of orbiting scroll 22, thereby sealing the mating surfaces of spiral element 22b of orbiting scroll 22 and circular end plate 21a of fixed scroll 21. O-ring seal element 40 is elastically disposed between an outer peripheral surface of circular end plate 21a of fixed scroll 21 and an inner peripheral surface of first cup-shaped portion 112 to seal the mating surfaces therebetween. Circular end plate 21a of fixed scroll 21 partitions an inner hollow space of compressor housing 11 into discharge chamber 50 and suction chamber 60.

Circular end plate 21a of fixed scroll 21 is provided with valved discharge port 21c axially formed therethrough so as to link discharge chamber 50 to a central fluid pocket (not shown), which is defined by fixed and orbiting scrolls 21 and 22. First cup-shaped portion 112 has cylindrical projection 112a forwardly projecting from a central region of an outer surface of a front end section thereof. Compressed refrigerant fluid is discharged from the central fluid pocket through valved discharged port 21c and into discharge chamber 50. Discharge chamber 50 is connected to an external cooling circuit (not shown) through axial hole 112b. Axial hole 112b, which functions as an outlet port of compressor 10, is formed through cylindrical projection 112a so as to be connected to an inlet of an element (not shown), e.g., a condenser, of the external cooling circuit through a pipe member (not shown).

Drive mechanism 30 comprises drive shaft 31 and motor 32 for rotating drive shaft 31. Drive shaft 31 comprises pin member 31a, which forwardly extends from, and is integral with, a front end of drive shaft 31. An axis of pin member 31a is radially offset from an axis of drive shaft 31, and pin member 31a is operatively connected to circular end plate 22a of orbiting scroll 22. Inner block 23 extends radially inward from, and is integral with, the front end of cylindrical portion 111 of compressor housing 11. Rotation preventing mechanism 24 is disposed between inner block 23 and circular end plate 22a of orbiting scroll 22 so that orbiting scroll 22 only orbits during rotation of drive shaft 31.

Inner block 23 comprises a central hole 23a of which the longitudinal axis is concentric with the longitudinal axis of cylindrical portion 111. Bearing 25 is fixedly disposed within central hole 23a so as to rotatably support a front end portion of drive shaft 31. Inner block 23 partitions suction chamber 60 into first suction chamber section 61 rearward of inner block 23 and second suction chamber section 62 forward of inner block 23. A plurality of holes 35 are axially formed through inner block 23 to link first and second suction chamber sections 61 and 62.

Second cup-shaped portion 113 comprises annular cylindrical projection 113a forwardly projecting from a central region of an inner surface of a rear end section thereof. The longitudinal axis of annular cylindrical projection 113a is concentric with the longitudinal axis of second cup-shaped portion 113. Bearing 26 is fixedly disposed within annular cylindrical projection 113a so as to rotatably support a rear end portion of drive shaft 31. Second cup-shaped portion 113 further comprises cylindrical projection 113b rearwardly projecting from a central region of an outer surface of the rear end section thereof. Axial hole 113c, which functions as an inlet port of compressor 10, is formed through cylindrical projection 113b so as to be connected to an outlet of another element (not shown), e.g., an evaporator, of an external cooling circuit, through a pipe member (not shown). The longitudinal axis of axial hole 113c is concentric with the longitudinal axis of annular cylindrical projection 113a. A diameter of axial hole 113c is slightly smaller than an inner diameter of annular cylindrical projection 113a.

First annular cut-out section 15 is formed at an inner periphery of an opening end surface of first cup-shaped portion 112 of compressor housing 11. Consequently, first annular projection 15a is formed at an outer periphery of the opening end surface of first cup-shaped portion 112. The longitudinal axis of an inner periphery of first annular projection 15a is concentric with the longitudinal axis of first cup-shaped portion 112. Second annular cut-out section 16 is formed at an outer periphery of a front opening end surface of cylindrical portion 111 of compressor housing 11. Consequently, second annular projection 16a is formed at an inner periphery of the front opening end surface of cylindrical portion 111. The longitudinal axis of an outer periphery of second annular projection 16a is concentric with the longitudinal axis of cylindrical portion 111. By the above-described construction, the opening end of first cup-shaped portion 112 and the front opening end of cylindrical portion 111 are connected to each other by a faucet joint. O-ring seal element 41 is elastically disposed at a rear end surface of first annular cut-out section 15 to seal the mating surfaces of first annular cut-out section 15 and second annular projection 16a.

Third annular cut-out section 17 is formed at an inner periphery of a rear opening end surface of cylindrical portion 111 of compressor housing 11. Consequently, third annular projection 17a is formed at an outer periphery of the rear opening end surface of cylindrical portion 111 of compressor housing 11. The longitudinal axis of an inner periphery of third annular projection 17a is concentric with the longitudinal axis of cylindrical portion 111. Fourth annular cut-out section 18 is formed at an outer periphery of an opening end surface of second cup-shaped portion 113 of compressor housing 11. Consequently, fourth annular projection 18a is formed at an inner periphery of the opening end surface of second cup-shaped portion 113. The longitudinal axis of an outer periphery of fourth annular projection 18a is concentric with the longitudinal axis of second cup-shaped portion 113. By the above-described construction, the opening end of second cup-shaped portion 113 and the rear opening end of cylindrical portion 111 are connected to each other by a faucet joint. O-ring seal element 42 is elastically disposed at a rear end surface of third annular cut-out section 17 to seal the mating surfaces of third annular cut-out section 17 and fourth annular projection 18a.

Drive shaft 31 further comprises first axial bore 31b axially extending therethrough. One end of first axial bore 31b is open at a rear end surface of drive shaft 31 so as to be adjacent to a front opening end of axial hole 113c. The other end of first axial bore 31b terminates at a position which is near to bearing 25. A plurality of radial bores 31c are formed at a front terminal end of first axial bore 31b so as to link the front terminal end of first axial bore 31b to first suction chamber section 61. Second axial bore 31d axially extends from the front terminal end of first axial bore 31b and is open at a front end surface of pin member 31a of drive shaft 31. A diameter of second axial bore 31d is smaller than a diameter of first axial bore 31b, and the longitudinal axis of second axial bore 31d is radially offset from the longitudinal axis of first axial bore 31b.

In operation a refrigerant fluid flowing from an outlet of one external element (not shown), e.g., an evaporator, is conducted into axial hole 113c and then flows through first axial bore 31b of drive shaft 31. A portion of the refrigerant fluid in first axial bore 31b flows into first suction chamber section 61 through radial bores 31c, and then further flows to second suction chamber section 62 through holes 35 of inner block 23. The remainder of the refrigerant fluid in first axial bore 31b of drive shaft 31 flows into second suction chamber section 62 through second axial bore 31d so that the frictional surfaces of the inner component parts which are associated with, or are adjacent to, pin member 31a of drive shaft 31 are effectively lubricated by a lubricant, for example, a lubricating oil which is suspended in the refrigerant fluid in a mist state. The refrigerant fluid in second suction chamber section 62 is taken into the outer sealed-off fluid pockets defined by the fixed and orbiting scrolls 21 and 22, and travels centrally with decreasing volume thereof, i.e., with compression thereof, in accordance with an orbital motion of orbiting scroll 22. The compressed refrigerant fluid is then discharged into discharge chamber 50 through valved discharge port 21c of circular end plate 21a of fixed scroll 21. The discharged refrigerant fluid in discharge chamber 50 flows through axial hole 112b to an inlet of another external element (not shown), e.g., a condenser.

Annular cylindrical projection 113d rearwardly projects from a peripheral region of the outer surface of the rear end section of second cup-shaped portion 113. One portion of annular cylindrical projection 113d is integral with one portion of cylindrical projection 113b. An insulating base 27 having external power conductor terminals 27a is firmly secured to a rear end of annular cylindrical projection 113d by a plurality of bolts (not shown). O-ring seal element 43 is elastically disposed at a rear end surface of annular cylindrical projection 113d so as to seal the mating surfaces of insulating base 27 and annular cylindrical projection 113d.

Motor 32 comprises annular-shaped rotor 33 fixedly surrounding an exterior surface of drive shaft 31 and annular-shaped stator assembly 34 surrounding rotor 33 with a small radial air gap therebetween. Stator assembly 34 comprises annular magnetic core 341 which has a plurality of axially extending slots 341a formed at an inner peripheral surface thereof and a plurality of windings, each having a plurality of coils formed by multiple turns of an enamel-coated conductor 342. The multiple turns of conductor 342 have side turn portions (not shown) disposed within axially extending slots 341a and front and rear end turn portions 342a and 342b which axially project from slots 341a and are disposed about front and rear axial end surfaces of core 341, respectively.

The windings are electrically connected to each other and to one end of conductor leads 343 in various configurations depending on, for example, the number of windings and whether the windings are to be connected in parallel or in series. These electrical interconnections may be made by various techniques, such as brazing, soldering, crimping, or other connecting technique. The connection points are generally disposed within or about rear end turn portion 342b of the multiple turns of conductor 342. The other end of conductor leads 343 is electrically connected to an inner end of external power conductor terminals 27a, which are fixedly and insulatingly held by insulating base 27, with the electrical interconnections being made by various techniques, such as brazing, soldering, crimping, or other connecting technique. Another end of external power conductor terminals 27a is connected to an external electric power source (not shown) through external conductor leads (not shown).

Annular magnetic core 341 axially extends along a rear opening end region of cylindrical portion 111 and an opening end region of second cup-shaped portion 113. Annular magnetic core 341 is disposed between a first annular ridge 111a formed at an inner peripheral surface of cylindrical portion 111 and a second annular ridge 113e formed at an inner peripheral surface of second cup-shaped portion 113. The axial length of annular magnetic core 341 is slightly smaller than an axial distance between first annular ridge 111a and second annular ridge 113e.

In a process of assembling compressor 10, core 341 of stator assembly 34 is fixedly secured to the rear opening end region of cylindrical portion 111 and to the opening end region of second cup-shaped portion 113 by a shrinkage fit technique. According to this technique, core 341 is inserted into either the rear opening end region of cylindrical portion 111, until an outer peripheral portion of a front end surface of core 341 is in contact with a side wall of first annular ridge 111a, or the opening end region of second cup-shaped portion 113, until an outer peripheral portion of a rear end surface of core 341 is in contact with a side wall of second annular ridge 113e.

An electrical insulation structure for compressor 10 will now be described in detail. The connection points between conductor leads 343 and external power conductor terminals 27a are hermetically buried in a coagulum 350 of a plastic having good electrical insulation and anti-heat characteristics, e.g., an epoxy resin. Coagulum 350 is preferably formed in the following manner. Liquid epoxy resin is poured into a hollow space 113f, which is defined by insulating base 27 and annular cylindrical projection 113d, until the connection points between conductor leads 343 and external power conductor terminals 27a are submerged in the liquid epoxy resin. Then, the liquid epoxy resin is cured to be fixedly disposed within the hollow space 113f. Therefore, even if a refrigerant having a relatively high conductivity, for example, $C_2H_2F_4$ (HFC-134a) or $CClHF_2$ (HCFC-22), is charged into the refrigerant circuit while compressor 10 operates in a situation where suction chamber 60 is in a liquid-rich state, unintentional conduction of electricity to housing 11 from the above-described connection points, through the refrigerant, can be minimized.

Additionally, a portion of the exterior surface of front and rear end turn portions 342a and 342b of the multiple turns of conductor 342 is fixedly coated by a film 351 of a plastic having good electrical insulation and anti-heat characteristics, e.g., an epoxy resin. Film 351 is preferably fixedly coated on the entire exterior surface of front and rear end turn portions 342a and 342b of the multiple turns of conductor 342 by dip coating or other suitable coating technique. In this embodiment, a thickness of film 351 of epoxy resin is preferably controlled in the process of dip coating to be about 0.5 mm. Thereby, the connection points between the windings themselves, and between the windings and conductor leads 343, and apertures, such as pin holes (not shown) and the separated portions of enamel (not shown) at the exterior surface of end turn portions 342a and 342b of the multiple turns of conductor 342, are preferably fixedly covered by film 351 of epoxy resin. Therefore, even if a refrigerant having a relatively high conductivity, for example, $C_2H_2F_4$ (HFC-134a) or $CClHF_2$ (HCFC-22), is charged into the refrigerant circuit while compressor 10 operates in a situation where suction chamber 60 is in a liquid-rich state, unintentional conduction of electricity to housing 11 from the above-described connection points, through the refrigerant, can be minimized. Accordingly, a person can touch compressor housing 11 to service compressor 10 without receiving an unsafe and offensive electric shock.

Further, although epoxy resin is used in this embodiment as the material having good electrical insulation and anti-heat characteristics, other material having good electrical insulation and anti-heat characteristics, for example, phenol resin may be used.

Referring to FIGS. 2–5, in another embodiment of the present invention, a compressor 100 comprises compressor housing 11 having cylindrical portion 111 and first and second cup-shaped portions 122 and 113, each of which is made of an aluminum alloy. Connection points resulting from electrical interconnections exist, for example, between the windings of conductor 342 themselves, between the windings of conductor 342 and conductor leads 343, and between conductor leads 343 and external power conductor terminals 27a. These connection points may be covered by tubular members (not shown) of a plastic having good electrical insulation characteristics, as referred to in the description of the related art. According to this embodiment, at least a portion of compressor housing 11 is insulatingly covered by a material having an electrical insulation characteristic.

An electrical insulation structure for compressor 100 will now be described in detail. According to one aspect of this embodiment, at least a portion of a surface of housing 11 is insulatingly covered. Preferably, before assembling compressor 100 an entire surface of each of cylindrical portion 111 and first and second cup-shaped portions 112 and 113 is covered by a film 451 of aluminum oxide formed by a process of anodization. Accordingly, when compressor 100 is assembled, the entire inner and outer surfaces of compressor housing 11 are fixedly covered with film 451 of aluminum oxide. Further, for explanation purposes only, FIG. 2 partially illustrates film 451 of aluminum oxide fixedly covering the entire inner and outer surfaces of compressor housing 11. A thickness of film 451 of aluminum oxide is controlled in a process of anodization and is preferably in the range of 15–50 µm.

As a result of this aspect, even when a refrigerant having a relatively high conductivity, for example, $C_2H_2F_4$ (HFC-134a) or $CClHF_2$ (HCFC-22), is charged into the refrigerant circuit while compressor 100 operates in a situation where suction chamber 60 is in a liquid-rich state, compressor housing 11 is sufficiently and effectively insulated from unintentional conduction of electricity, through the refrigerant, from the above-described connection points and apertures. Accordingly, a person can touch compressor housing 11 to service compressor 100 without receiving an unsafe and offensive electric shock.

Figure 3:
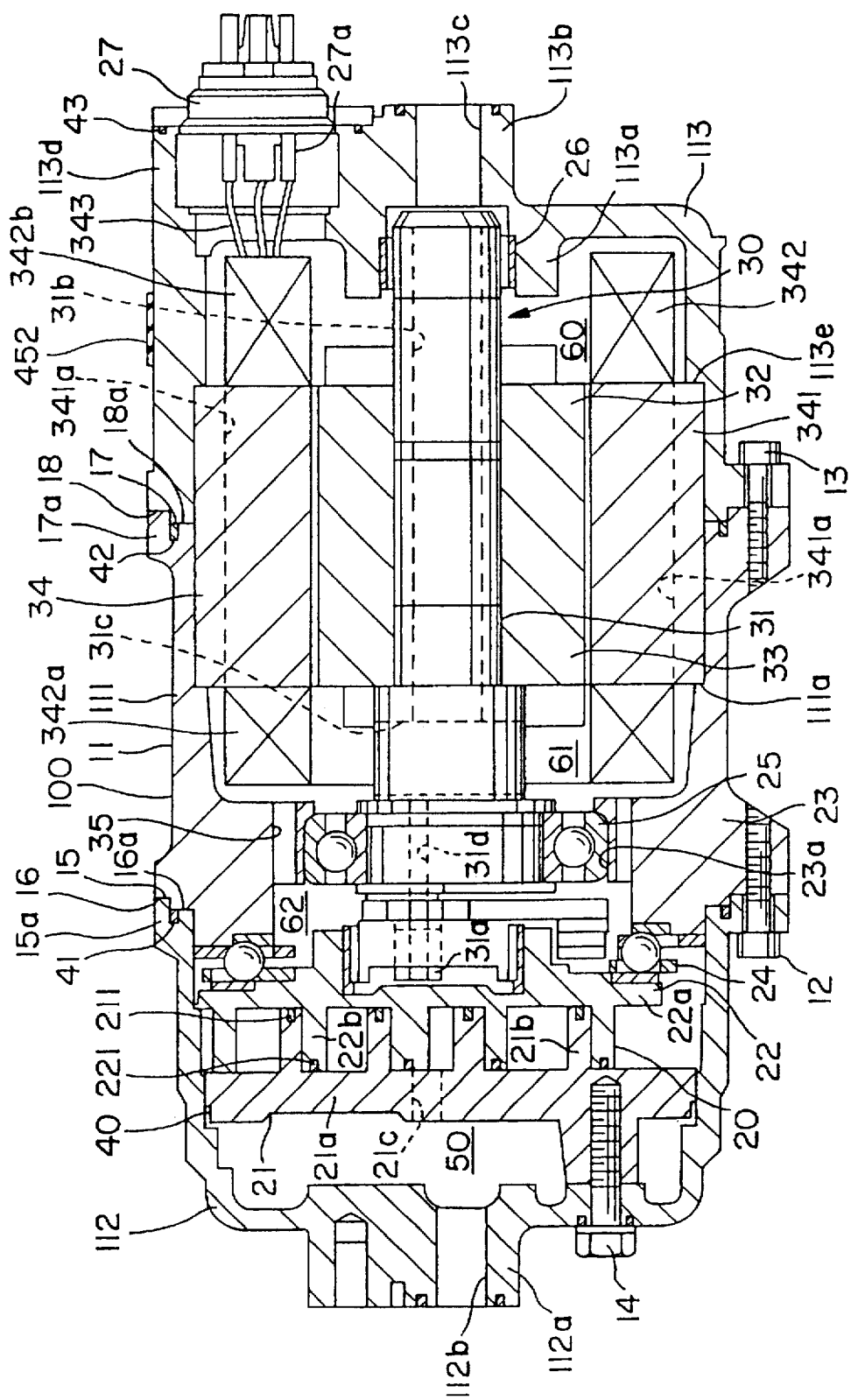
FIG. 3 is a longitudinal sectional view of a motor driven fluid apparatus according to a second aspect of the second embodiment of the present invention.

Referring to FIG. 3, according to another aspect of this embodiment, a portion of an outer surface of compressor housing 11 is insulatingly covered. Preferably, before compressor 100 is assembled, the entire outer surface of compressor housing 11 is fixedly covered with a film 452 of aluminum oxide. Alternately, this coverage can be achieved after compressor 100 is assembled. Further, for explanation purposes only, FIG. 3 partially illustrates film 452 of aluminum oxide fixedly covering the entire outer surface of compressor housing 11. A thickness of film 452 of aluminum oxide is controlled in a process of anodization and is preferably in the range of 15–50 µm.

As a result of this aspect, even when a refrigerant having a relatively high conductivity, for example, $C_2H_2F_4$ (HFC-134a) or $CClHF_2$ (HCFC-22), is charged into the refrigerant circuit while compressor 100 operates in a situation where suction chamber 60 is in a liquid-rich state, compressor housing 11 is sufficiently and effectively insulated from unintentional conduction of electricity, through the refrigerant, from the above-described connection points and apertures. Accordingly, a person can touch compressor housing 11 to service compressor 100 without receiving an unsafe and offensive electric shock.

Figure 4:
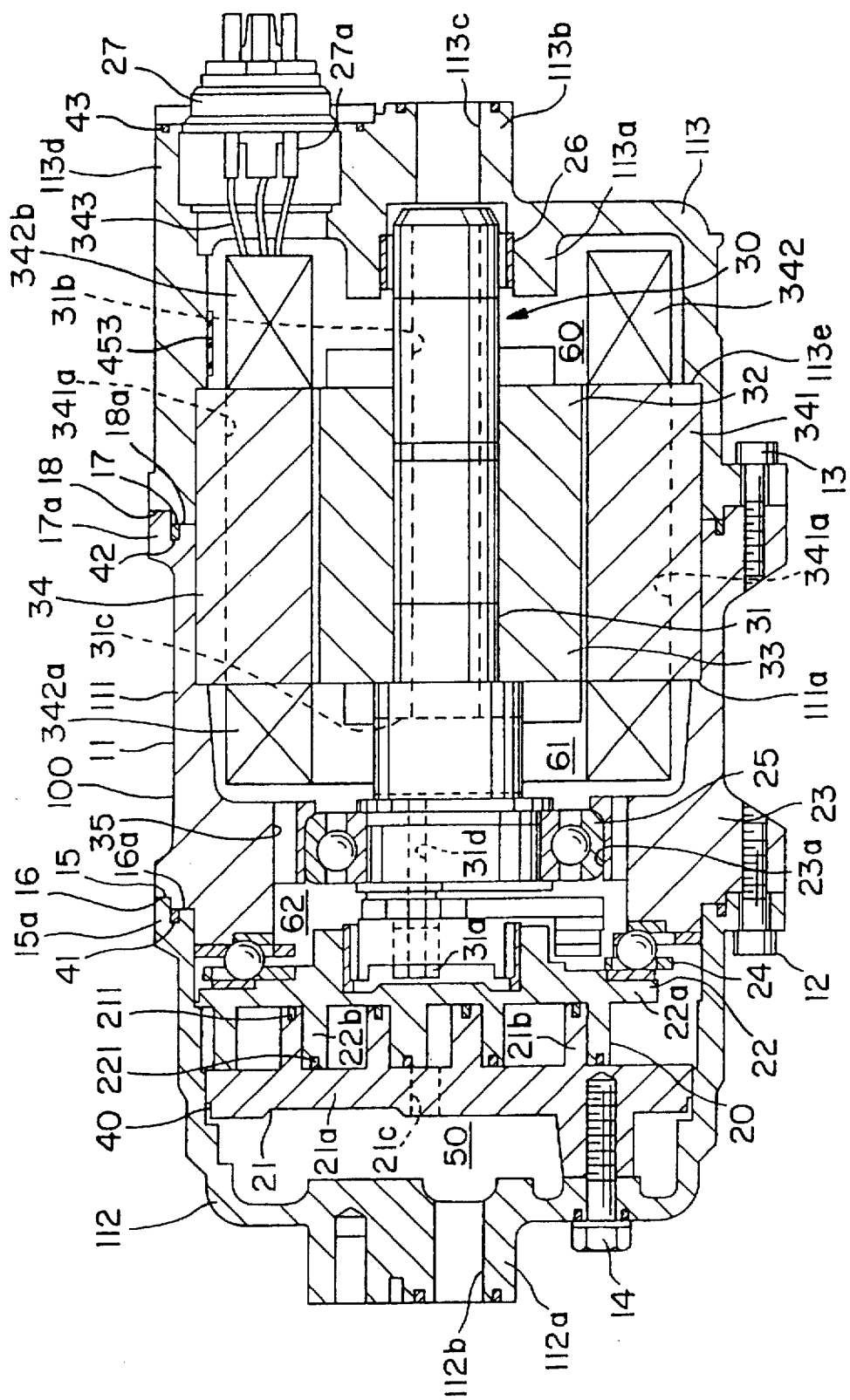
FIG. 4 is a longitudinal sectional view of a motor driven fluid apparatus according to a third aspect of the second embodiment of the present invention.
Figure 5:
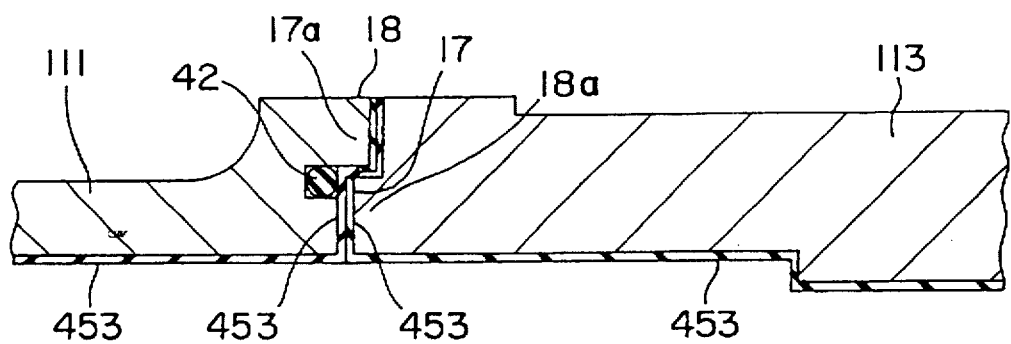
FIG. 5 is an enlarged cross-sectional view of part of a housing of a motor driven fluid apparatus according to the second embodiment of the present invention.

Referring to FIG. 4, according to yet another aspect of this embodiment, a portion of an inner surface of compressor housing 11 is insulatingly covered. Preferably, before compressor 100 is assembled, the entire inner surface of compressor housing 11 is fixedly covered with a film 453 of aluminum oxide. Additionally, as most clearly depicted in FIG. 5, the mating surfaces between each of cylindrical portion 111, and first and second cup-shaped portions 112 and 113, are also preferably fixedly covered with film 453 of aluminum oxide. Further, for explanation purposes only, FIG. 4 illustrates film 453 of aluminum oxide partially fixedly covering the inner surface of compressor housing 11 and the mating surfaces between each of cylindrical portion 111 and first and second cup-shaped portions 112 and 113. A thickness of film 453 of aluminum oxide is controlled in a process of anodization and is preferably in the range of 15–50 µm.

As a result of this aspect, even when a refrigerant having a relatively high conductivity, for example, $C_2H_2F_4$ (HFC-134a) or $CClHF_2$ (HCFC-22), is charged into the refrigerant circuit while compressor 100 operates in a situation where suction chamber 60 is in a liquid-rich state, compressor housing 11 is sufficiently and effectively insulated from unintentional conduction of electricity, through the refrigerant, from the above-described connection points and apertures. Accordingly, a person can touch compressor housing 11 to service compressor 100 without receiving an unsafe and offensive electric shock.

According to all aspects of this embodiment, mating surfaces between each of cylindrical portion 111, and first and second cup-shaped portions 112 and 113, may be fixedly covered with a film of aluminum oxide as described above in connection with FIGS. 4–5. Further, although a film of aluminum oxide is the material preferably used in the electrical insulation structure, the present invention can employ other electrically insulating materials including, but not limited to, a film of either epoxy resin or urethane resin formed by powder coating, or a film of silicone, phenol resin, urethane resin, butyl rubber, ethylene propylene rubber, chloroprene rubber, or nitrite-butadiene rubber, where the film is formed by dip coating or by application to the covered portion of the surface of compressor housing 11.

Also, according to this embodiment, compressor housing 11 is preferably made of an aluminum alloy in order to assist in the formation of the film of aluminum oxide (451, 452, 453) on the surface thereof by anodization. However, compressor housing 11 may be made of other materials, such as steel, if the surface of the compressor housing is fixedly covered with a film of electrically insulating material other than aluminum oxide.

Moreover, according to all embodiments of the present invention, a scroll-type fluid compression mechanism is described as the compression mechanism used in the motor driven fluid apparatus. However, the preferred embodiments can use other types of compression mechanisms, such as a vane-type, a rolling piston-type, or an axial piston-type compression mechanism, or other suitable compression mechanism. These various types of compression mechanisms are generally well-known and, for convenience, the details thereof are omitted.

Although this invention has been described in detail in connection with the preferred embodiments, the description is merely for example purposes only and the scope of the present invention is not limited thereto. It will be understood by those of ordinary skill in the art that other variations and modifications can be easily made within the scope of this invention as defined by the appended claims.

We claim:

1. In a hermetic motor driven fluid apparatus comprising a housing; a compression mechanism disposed within said housing; and a drive mechanism disposed within said housing, said drive mechanism comprising a drive shaft operatively connected to said compression mechanism, and a motor operatively connected to said drive shaft for rotating said drive shaft, the improvement comprising:

a portion of a surface of said housing being insulatingly covered by a film of an electrical insulation material.

2. The hermetic motor driven fluid apparatus of claim 1 wherein said housing is made of steel.

3. The hermetic motor driven fluid apparatus of claim 1 wherein said housing is made of an aluminum alloy.

4. In a hermetic motor driven fluid apparatus comprising a housing; a compression mechanism disposed within said housing; and a drive mechanism disposed within said housing, said drive mechanism comprising a drive shaft operatively connected to said compression mechanism, and a motor operatively connected to said drive shaft for rotating said drive shaft, the improvement comprising:

a portion of a surface of said housing being insulatingly covered by a film of an electrical insulation material;

said housing is made of an aluminum alloy; and, said film comprising a film of aluminum oxide formed by anodization.

5. A hermetic motor driven fluid apparatus comprising an aluminum alloy housing:

a compression mechanism disposed within said housing;

and a drive mechanism disposed within said housing, said drive mechanism comprising a drive shaft operatively connected to said compression mechanism;

a motor operatively connected to said drive shaft for rotating said drive shaft;

wherein a portion of a surface of said housing is insulatingly covered by a film of an electrical insulation material, said film comprising a film of aluminum oxide formed by anodization; and wherein said film has a thickness in the range of from about 15 μm to about 50 μm.

6. The hermetic motor driven fluid apparatus of claim 1, said electrical insulation material comprising a material selected from the group consisting of epoxy resin, urethane resin, silicone, phenol resin, urethane resin, silicone, phenol resin, urethane resin, butyl rubber, ethylene propylene rubber, chloroprene rubber, and nitrile-butadiene rubber.

7. A hermetic motor driven fluid apparatus comprising a housing;

a stator assembly separate from said housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material;

wherein said electrical insulation material comprises a material selected from the group consisting of epoxy resin, urethane resin, silicone, phenol resin, urethane resin, butyl rubber, ethylene propylene rubber, chloroprene rubber, and nitrile-butadiene rubber; and wherein said film is formed by powder coating.

8. The hermetic motor driven fluid apparatus of claim 7 wherein said film has a thickness in the range of from about 15 μm to about 50 μm.

9. A hermetic motor driven fluid apparatus comprising a housing;

a stator assembly separate from said housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material;

wherein said electrical insulation material comprises a material selected from the group consisting of epoxy resin, urethane resin, silicone, phenol resin, urethane resin, butyl rubber, ethylene propylene rubber, chloroprene rubber, and nitrile-butadiene rubber; and wherein said film is formed by dip coating.

10. The hermetic motor driven fluid apparatus of claim 9 wherein said film has a thickness in the range of from about 15 μm to about 50 μm.

11. The hermetic motor driven fluid apparatus of claim 6 wherein said film is formed by application.

12. A hermetic motor driven fluid apparatus comprising a housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material;

wherein said electrical insulation material comprises a material selected from the group consisting of epoxy resin, urethane resin, silicone, phenol resin, urethane resin, butyl rubber, ethylene propylene rubber, chloroprene rubber and nitrile-butadiene rubber; and wherein said film is formed by application and has a thickness in the range of from about 15 μm to about 50 μm.

13. A hermetic motor driven fluid apparatus comprising a housing;

a stator assembly separate from said housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material; and wherein said housing has an interior surface and an exterior surface, and wherein a portion of said interior surface is insulatingly covered by said film.

14. A hermetic motor driven fluid apparatus comprising a housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material; and wherein said housing has an interior surface and an exterior surface, and wherein a portion of said exterior surface is insulatingly covered by said film.

15. A hermetic motor driven fluid apparatus comprising a housing;

a compression mechanism disposed within said housing;

a drive mechanism disposed within said housing, said drive mechanism comprising a drive shaft operatively connected to said compression mechanism; and a motor operatively connected to said drive shaft for rotating said drive shaft;

wherein a portion of a surface of said housing is insulatingly covered by a film of an electrical insulation material; and wherein said housing comprises a plurality of housing portions, which are releasably and hermetically connected to define a plurality of mating surfaces therebetween, and wherein at least a portion of at least one of said plurality of mating surfaces is insulatingly covered by said film.

16. The hermetic motor driven fluid apparatus of claim 1 wherein said compression mechanism comprises a mechanism selected from the group consisting of a scroll compression mechanism, a vane compression mechanism, a rolling piston compression mechanism, and an axial piston compression mechanism.

17. A method of electrically insulating a stator assembly, comprising the steps of:

disposing the stator assembly within a housing; and insulatingly covering at least a portion of the surface of the housing with a film of an electrical insulation material.

18. A method of electrically insulating a stator assembly, comprising the steps of:

disposing the stator assembly within a housing;

insulatingly covering at least a portion of the surface of the housing with a film of an electrical insulation material;

wherein the housing is formed from an aluminum alloy; and, wherein the covering step comprises anodizing the housing to form a film of aluminum oxide.

19. A method of electrically insulating a stator assembly, comprising the steps of:

disposing the stator assembly within an aluminum alloy housing; and insulatingly covering at least a portion of the surface of the housing with a film of an electrical insulation material, said covering step comprising the steps of:

anodizing the housing to form a film of aluminum oxide; and forming the film to have a thickness in the range of from about 15 μm to about 50 μm.

20. The electrical insulation method of claim 17 wherein the electrical insulation material is a material selected from the group consisting of epoxy resin, urethane resin, silicone, phenol resin, urethane resin, butyl rubber, ethylene propylene rubber, chloroprene rubber, and nitrile-butadiene rubber.

21. A method of electrically insulating a stator assembly, comprising the steps of:

disposing the stator assembly within a housing;

wherein said stator assembly is separate from said housing; and insulatingly covering at least a portion of the surface of the housing with a film of an electrical insulation material, the electrical insulation material selected from the group consisting of epoxy resin, urethane resin, silicone, phenol resin, urethane resin, butyl rubber, ethylene propylene rubber, chloroprene rubber, and nitrile-butadiene rubber, said covering step comprising the step of:

forming the film by powder coating.

22. The electrical insulation method of claim 21 wherein the covering step further comprises forming the film to have a thickness in the range of from about 15 μm to about 50 μm.

23. A method of electrically insulating a stator assembly, comprising the steps of:

disposing the stator assembly within a housing;

wherein said stator assembly is separate from said housing; and insulatingly covering at least a portion of the surface of the housing with a film of an electrical insulation material, the electrical insulation material selected from the group consisting of epoxy resin, urethane resin, silicone, phenol resin, urethane resin, butyl rubber, ethylene propylene rubber, chloroprene rubber, and nitrile-butadiene rubber, said covering step comprising the step of:

forming the film by dip coating.

24. The electrical insulation method of claim 23 wherein the covering step further comprises forming the film to have a thickness in the range of from about 15 μm to about 50 μm.

25. The electrical insulation method of claim 20 wherein the covering step comprises forming the film by application.

26. A method of electrically insulating a stator assembly, comprising the steps of:

disposing the stator assembly within a housing; and insulatingly covering at least a portion of the surface of the housing with a film of an electrical insulation material, the electrical insulation material selected from the group consisting of epoxy resin, urethane resin, silicone, phenol resin, urethane resin, butyl rubber, ethylene propylene rubber, chloroprene rubber, and nitrile-butadiene rubber, said covering step comprising the step of:

forming the film by application to have a thickness in the range of from about 15 μm to about 50 μm.

27. The hermetic motor driven fluid apparatus of claim 5, further comprising a plurality of external power conductor terminals fixedly secured to the housing and a plurality of conductor leads electrically connected between the motor and the plurality of external power conductor terminals, wherein at least one of the connection points between the plurality of external power conductor terminals and the plurality of conductor leads is insulatingly covered by the film of an electrical insulation material.

28. The method of claim 27, wherein a plurality of external power conductor terminals is fixedly secured to the housing and wherein a plurality of conductor leads electrically connects the stator assembly to the plurality of external power conductor terminals, the method further comprising the step of insulatingly covering at least one of the connection points between the plurality of external power conductor terminals and the plurality of conductor leads with the film of an electrical insulation material.

* * * * *